Patented July 21, 1931

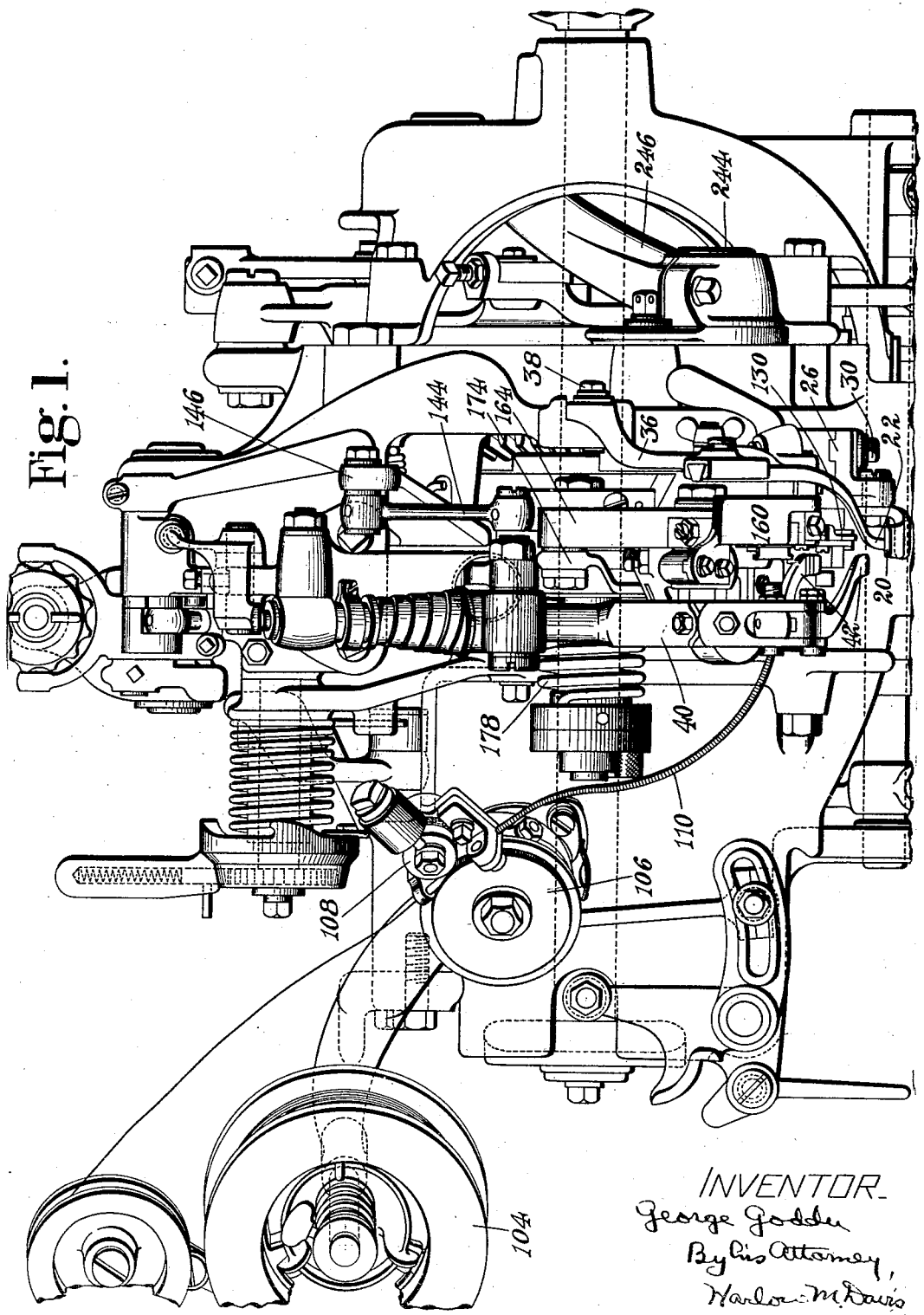

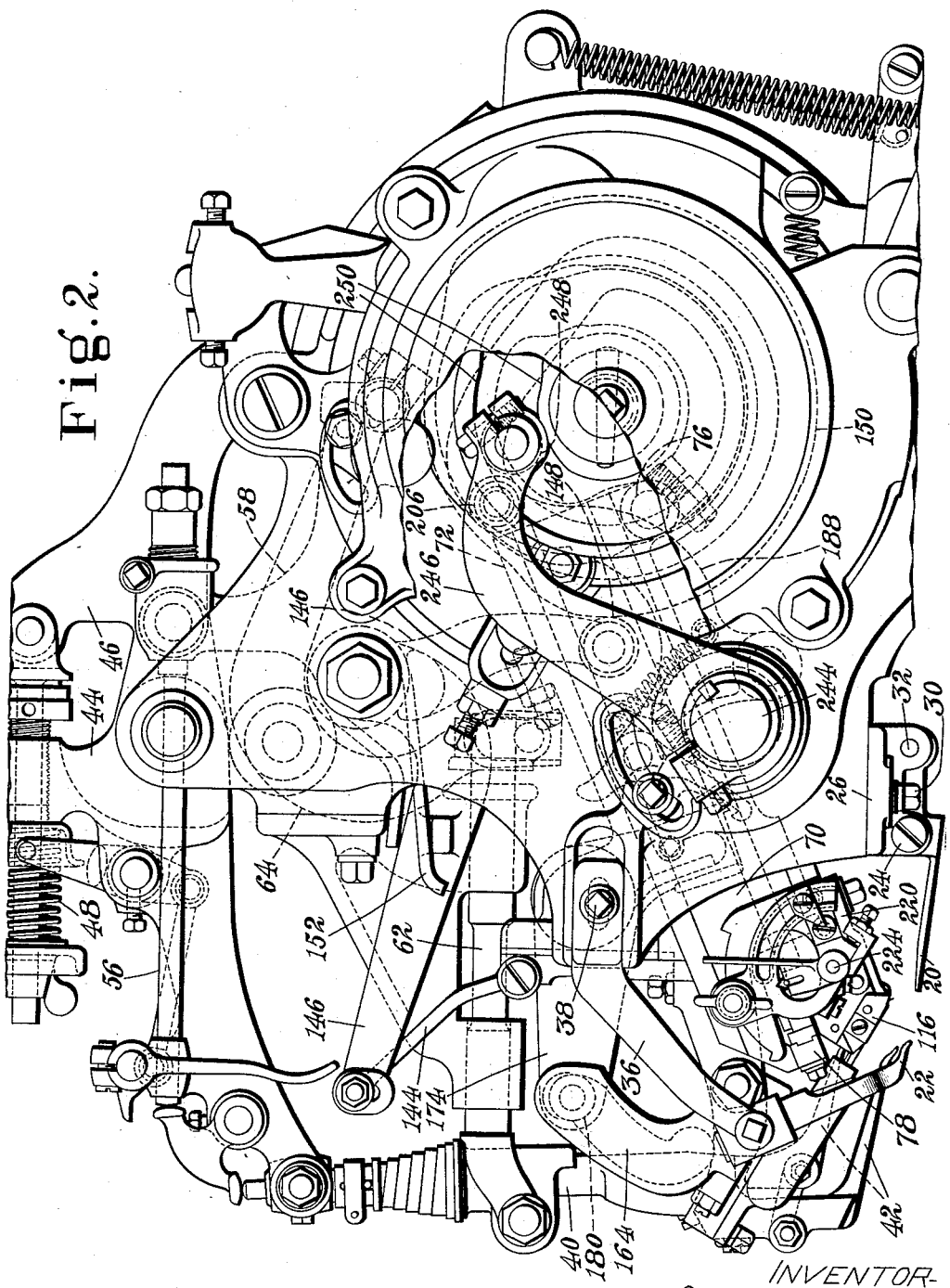

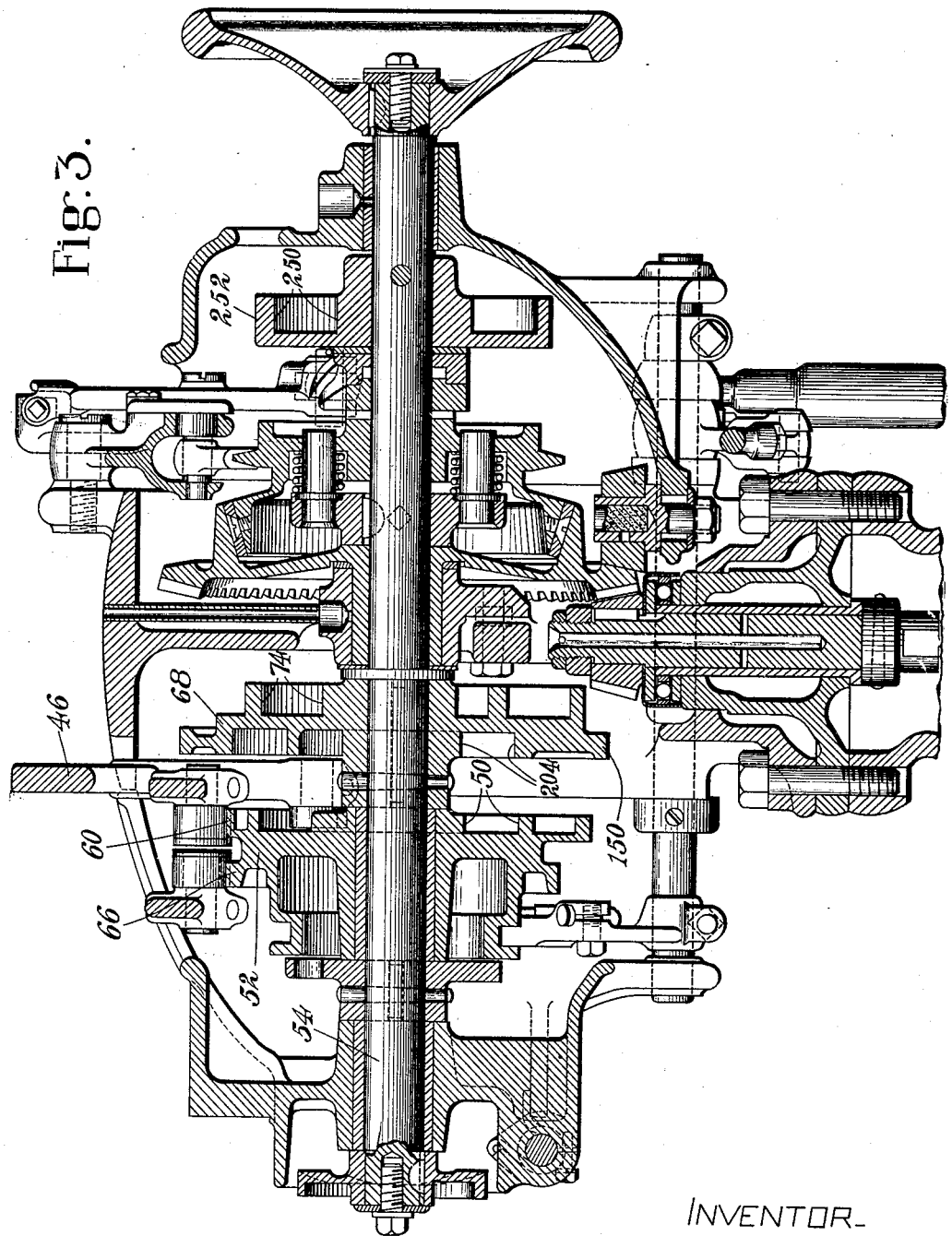

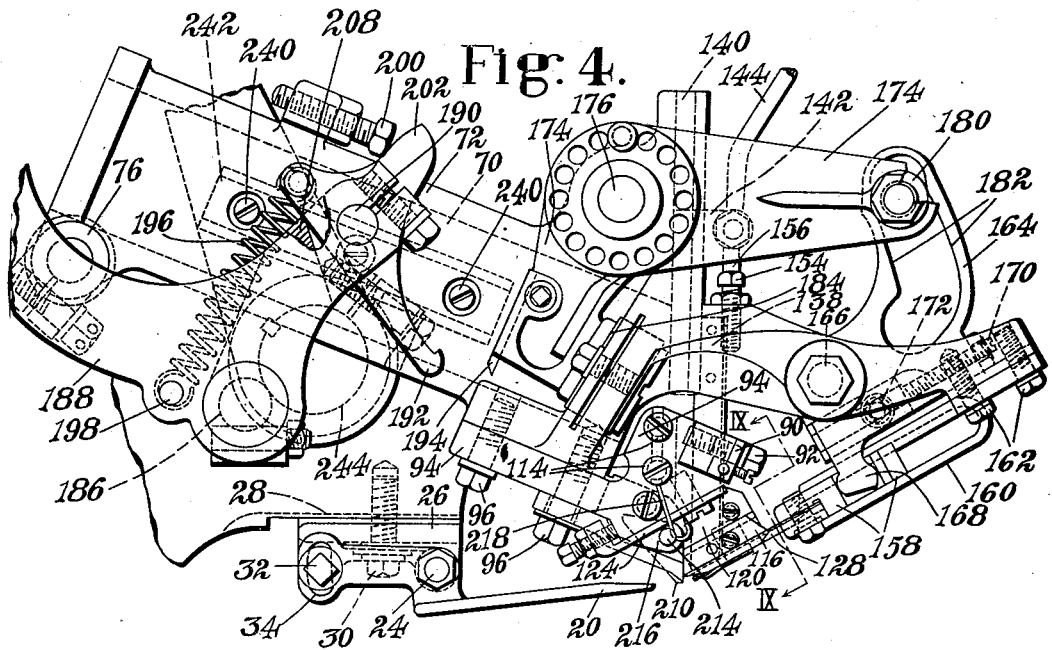
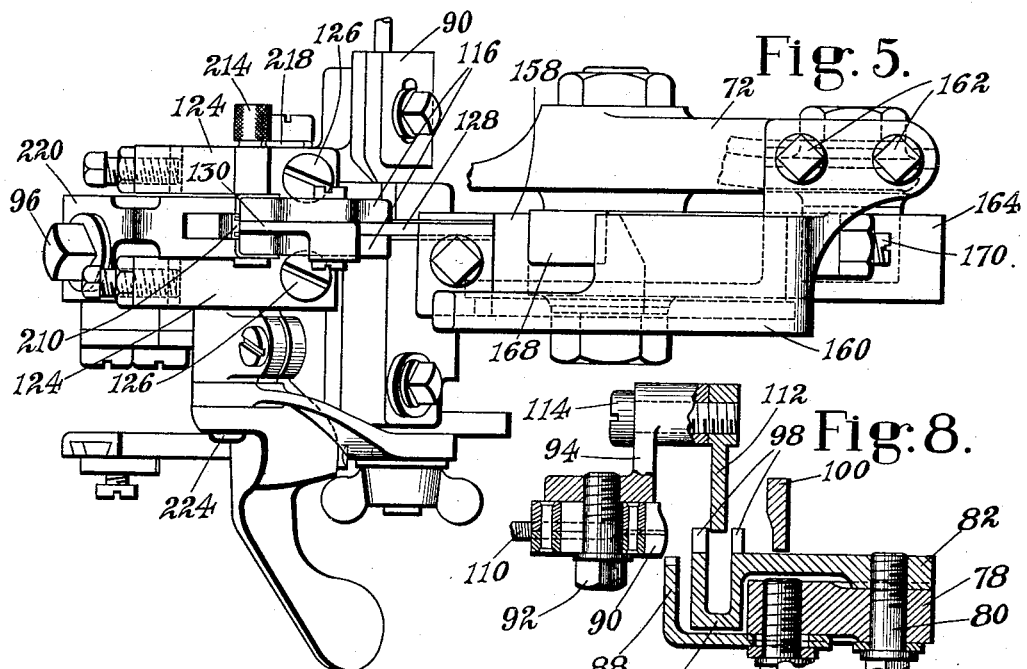

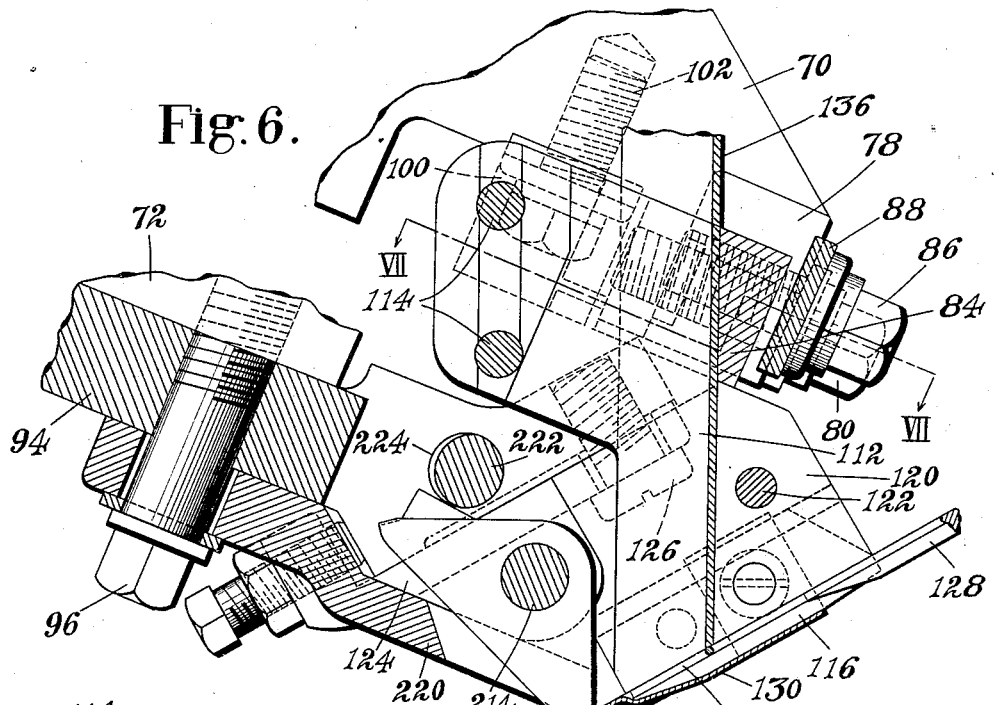
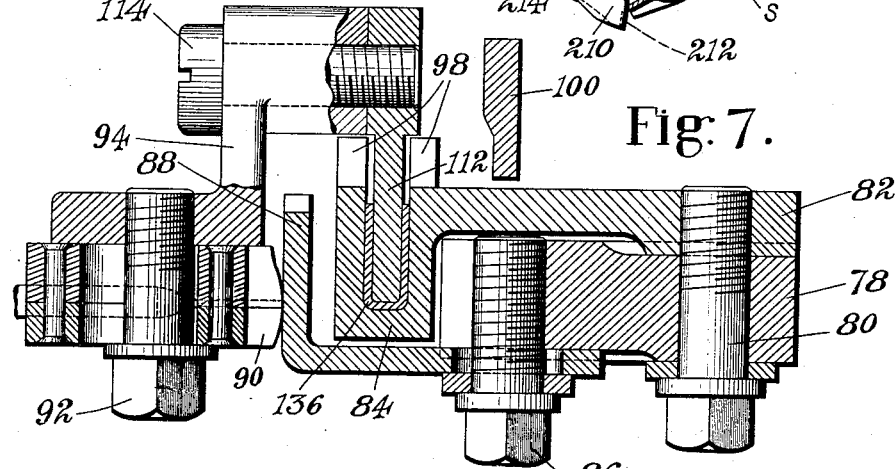

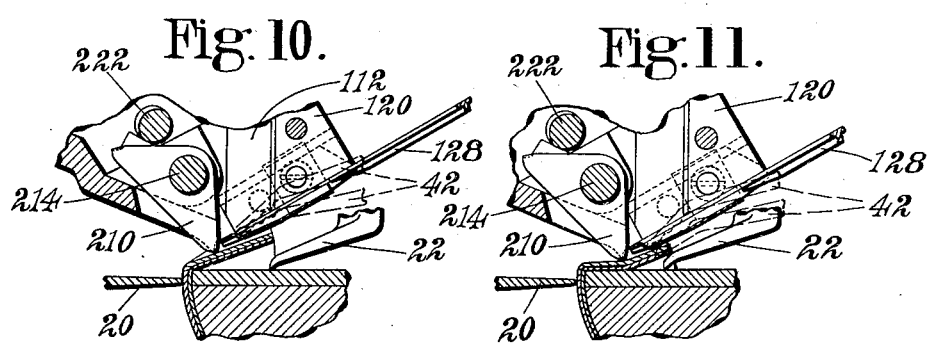
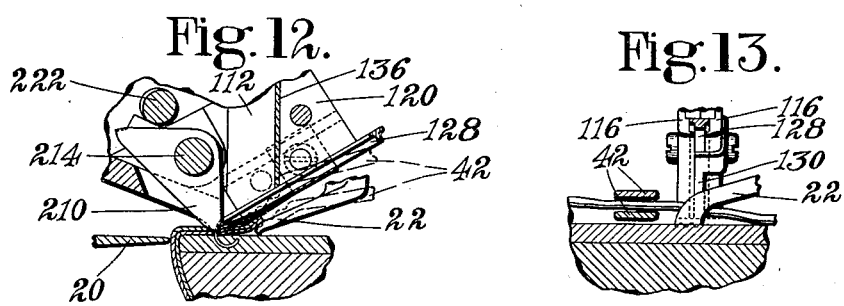
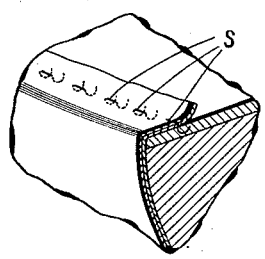
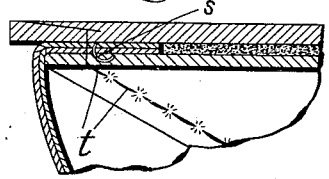

1,815,297

UNITED STATES PATENT OFFICE

GEORGE GODDU, OF WINCHESTER, MASSACHUSETTS, ASSIGNOR TO UNITED SHOE MACHINERY CORPORATION, OF PATERSON, NEW JERSEY, A CORPORATION OF NEW JERSEY

MACHINE FOR SHAPING UPPERS OVER LASTS

Original application filed July 29, 1927, Serial No. 209,299. Divided and this application filed January 21, 1930. Serial No. 422,453.

This invention relates to machines for shaping uppers over lasts, the present application being a division of a copending application, Serial No. 209,299, filed on July 29, 1927. The invention is herein illustrated as embodied in a lasting machine of that type which has means for pulling an upper over a last and for fastening it in different locations successively along the edge of the shoe bottom; but it is to be understood that in its more general aspects it is not limited to an organization of that particular character.

In Letters Patent No. 1,742,499, granted upon an earlier application of mine on January 7, 1930, I disclosed and claimed a lasting machine of the above-mentioned type having upper-pulling means and means for fastening the upper in each lasting location by a fastening, shown as a staple, anchored by curvature within the body of the insole instead of by clinching it on any surface of the work, the machine being especially, although not exclusively, adapted for use in the manufacture of shoes of that type in which the margin of the upper is lasted in substantially parallel relation to the outer or bottom face of the insole preparatory to the fastening of an outsole directly to the lasted margin, for example, by through-and-through stitches penetrating both the outsole and the insole. More particularly, in accordance with that disclosure, the legs of the staple were deflected in planes transverse to the cross-bar in the driving operation, by engaging them at the same side of the work from which the staple was driven, to cause them to follow curved paths in the insole. The present invention, in its illustrated embodiment, provides a novel organization including means for subjecting an upper to lasting strain and means for securing it by fastenings anchored by curvature in the same general manner as disclosed in the above-mentioned Letters Patent, by which novel organization the fastenings are so applied, having regard especially to the direction of the lasting strain on the upper, as to afford particularly effective insurance that the upper will be held tightly and securely in lasted relation to the insole. For the purpose in view, the machine herein shown comprises means for pulling the upper over the last and for laying its margin inwardly over the insole under lasting strain, and means for driving a staple through the upper and into the insole and for so deflecting the staple legs as to cause them to follow curved paths leading inwardly away from the edge of the insole to anchor them. With each staple applied in this manner, the pull of the lasted upper thereon, in a direction outwardly toward the edge of the insole, only tends to turn the staple about the axis of curvature of its legs in the same direction in which the legs were deflected in the insole, so that special insurance is afforded that the upper will be held tightly in lasted position.

In accordance with a further feature, the invention provides a novel organization such as to afford increased insurance that the upper after the pull will be firmly pressed against the insole. Machines of the type illustrated, when constructed for operation on shoes of the character above mentioned, are provided with a shoe bottom rest or sole rest against which the operator holds the shoe and relatively to which the shoe may be variably tipped or inclined by the operator, and with means which is moved a fixed distance inwardly over the shoe bottom, as herein illustrated in a direction inclined downwardly toward the outer or bottom face of the insole, to lay the margin of the tensioned upper over the insole and then to hold it pressed against the insole in a different location from the sole rest after its release by the gripper until it is fastened to the insole. An object in view in this part of the invention is to insure that the upper will always be pressed firmly against the insole by the overlaying means, notwithstanding small variations in the tipping of the shoe relatively to the sole rest, and thus to relieve the operator of the necessity of exercising such a high degree of care as heretofore in positioning and holding the shoe. For the purpose in view the machine herein shown is provided with mechanism for imparting to the overlaying means, after its movement inwardly over the shoe bottom as above described, a movement in a different direction toward the bottom face of the insole to increase its pressure on the upper. A further advantageous result of such movement of the overlaying means in the construction herein shown, in which the overlaying means and the fastening means are combined to move as a unit, is that increased insurance is afforded that the fastening means will be positioned in such close relation to the insole that the fastening will be fully driven and securely anchored in the insole.

The novel features of the invention will now be more particularly described by reference to the accompanying drawings and thereafter pointed out in the claims.

In the drawings,

Fig. 1 is a view in front elevation of the head portion of a machine in which the novel features of the invention are embodied;

Fig. 2 is a view of the head of the machine in right-hand side elevation;

Fig. 3 is a vertical section in a plane parallel to the front of the machine;

Fig. 4 is a left-hand side elevation of a portion of the overlaying and fastening mechanism;

Fig. 5 is an inverted plan view of the right-hand portion of the structure shown in Fig. 4, on an enlarged scale;

Fig. 6 is a view of a portion of the overlaying and fastening mechanism in vertical section;

Fig. 7 is a section on the line VII—VII of Fig. 6;

Fig. 8 is a view similar to Fig. 7, on a smaller scale, showing the parts differently positioned;

Fig. 9 is a section on the line IX—IX of Fig. 4;

Figs. 10, 11 and 12 are detail views showing the positions of the upper-pulling, overlaying and fastening instrumentalities at different times in operating on a shoe;

Fig. 13 is a view at a different angle illustrating more clearly the relation between the upper-pulling means and the overlaying and fastening means with the parts positioned as in Fig. 12;

Fig. 14 is a perspective view of a portion of a lasted shoe which has been operated upon by the machine; and Fig. 15 is a sectional view of a completed shoe of the through-and-through sewed type, illustrating the relation of the upper-fastening staples to the outsole stitches.

The machine herein shown, except for the construction of portions of the overlaying and fastening means and the shoe-positioning means, is similar in its general organization to the machine shown and described in Letters Patent No. 1,796,451, granted upon an application of mine on March 17, 1931, and accordingly such features as are common to the disclosure of said Letters Patent need be described herein only in brief terms.

To assist the operator in positioning for the operation of the machine shoes of the illustrated type in the manufacture of which the upper is fastened in lasted position to the plane bottom face of the insole, there are provided an edge rest 20 for engaging the side of the shoe near the edge of the shoe bottom and a sole rest 22 for engaging the bottom face of the insole at a considerable distance from the edge of the shoe bottom. The edge rest 20 is pivotally mounted at 24 on a bracket 26 which is adjustable along a guideway 28 (Fig. 4) formed in the head of the machine to vary the position of the shoe laterally and thereby to determine the distance from the edge of the shoe bottom at which the fastenings are driven, the bracket 26 being held in adjusted position by a cap-screw 30. The edge rest 20 may also be adjusted in a vertical plane about its pivot 24 on the bracket 26, to vary the height of its shoe-engaging end, and it is held in adjusted position by a cap-screw 32 which is threaded in the bracket 26 and extends through a slot 34 formed in a rearward extension of the edge rest member. The sole rest 22 may be adjusted upwardly or downwardly in a bracket 36 (Fig. 2) by which it is supported, and this bracket is adjustable horizontally in a guideway formed in the head of the machine to vary the distance from the edge of the shoe bottom at which the sole rest engages the shoe, the bracket being held in adjusted position by a cap-screw 38.

For pulling the upper heightwise of the last and inwardly over the insole there is provided a gripper 40 the construction of which, and likewise that of its operating mechanism, are substantially like what is disclosed in Letters Patent No. 1,796,451. The gripper is provided with a pair of jaws 42 which in the construction herein shown are curved laterally, as shown in Fig. 1, to permit the remainder of the gripper to be offset lengthwise of the edge of the shoe bottom relatively to the overlaying and fastening means and thereby to afford room for the operation of this means. It will further be observed that the upper-gripping ends of the jaws 42 are somewhat displaced lengthwise of the edge of the shoe bottom from the insole-engaging end of the sole rest 22. Preferably, as shown, that gripper jaw which engages the lining side of the upper has a smooth face, while the other jaw has a toothed face, so that under some conditions the lining-engaging jaw may slip on the lining and thereby prevent the lining from limiting the stretching of the upper leather. As more fully described in the last-mentioned Letters Patent, the gripper is operated to pull the upper heightwise of the last by a two-part updraw lever 44, 46, the parts of which are yieldingly connected by a spring 48, this lever being operated by a path cam 50 formed in one side of a cam wheel 52 on a cam shaft 54 (Fig. 3). The gripper jaws 42 are closed by means including a push rod 56 which is operated by a lever 58 from a peripheral cam 60 on the cam wheel 52. In addition to its updraw movement the gripper 40 receives overdraw movement to pull the upper inwardly over the bottom of the insole from an overdraw rod 62 which is operated by a lever 64 from a cam 66 on the cam wheel 52.

The means for operating and controlling the cam shaft 54 need not be described herein in detail, since it is substantially the same as the means fully described in the last-metioned Letters Patent. This cam shaft has fast thereon a cam wheel 68 for operating the overlaying and fastening mechanism hereinafter described. The cam wheel 52, which carries the cams for operating and controlling the gripper as above described, is not fast on the cam shaft 54, but is so mounted and controlled that it may be connected to the cam shaft or held stationary during the operation of the cam shaft, at the will of the operator, so that the machine may, if desired, be used solely as a stapling machine without pulling the upper. In these respects also the machine is substantially like that disclosed in said Letters Patent, and details of the means for controlling the cam wheel 52 are accordingly not described herein.

The overlaying and fastening mechanism, including means for forming staples above the line of drive and for transferring them into alinement with the staple driver, is for the most part movable bodily toward and from the shoe in directions inclined to the outer or bottom face of the insole and acts in its movement toward the shoe to lay the margin of the upper over the insole into position to be fastened. Supported on the head of the machine in a manner hereinafter described is a member 70 which is so formed as to provide a forwardly and downwardly inclined guideway for a movable slide 72 (Fig. 4), this slide having mounted thereon the staple-transferring, driving and deflecting mechanisms and a portion of the staple-forming mechanism. For moving the slide 72 along its guideway toward and from the shoe, there is formed in one side of the cam wheel 68 (Fig. 3) a path cam 74 which engages a roll 76 (Figs. 2 and 4) on the slide.

Secured to a bracket 78 integral with the front end portion of the member 70, by means of a cap-screw 80, is a plate 82 which is shaped at its left-hand end (Figs. 7 and 8) to provide an outside former 84 for forming the staples. Secured also adjustably on the bracket 78, by a cap-screw 86, is an angular plate 88 which serves as a shearing member for severing from a strand of staple wire a section of the proper length for a staple.

Co-operating with the shearing plate 88 is a wire-guiding nozzle 90 comprising two plates which are clamped together and are secured adjustably by a cap-screw 92 to a bracket 94, this bracket being fastened to the lower face of the front end portion of the slide 72 by screws 96 (Fig. 4). The nozzle 90 is thus moved forwardly by the slide 72, and its outlet end is positioned in such close relation to the shearing plate 88 that the wire is cut in response to such movement. When the slide 72 is in its retracted position, as illustrated in Fig. 8, the wire is fed from the nozzle 90 through guiding slots 98 in the opposite sides of the outside former 84 until its end engages a stop plate 100 secured by a screw 102 (Fig. 6) to the member 70. The wire is fed from a reel 104 (Fig. 1) by feed rolls 106, 108 which are operated by mechanism fully described in the above-mentioned Letters Patent No. 1,796,451. From the feed rolls the wire is advanced through a flexible tube 110 to the nozzle 90. Co-operating with the outside former 84 is an inside former 112 which is secured by cap-screws 114 to the bracket 94 on the slide 72. The inside former is thus moved forwardly by the slide 72 to engage the section of wire severed by the shearing member 88 and the nozzle 90 and force it into the outside former to form a staple.

The position in which the staple is formed is considerably above the position which it occupies at the time when it is driven, and it is transferred downwardly into driving position by mechanism hereinafter described. For guiding the staple in the driving operation there is provided a nozzle comprising members 116 (Fig. 9) secured in opposed relation, by means of screws 118, to plates 120 which are fastened together side by side by a screw 122. The plates 120 are provided with flanges 124 which are fastened by screws 126 (Fig. 6) to the bracket 94 on the slide 72. The members 116 are shaped to extend inwardly under the lower edges of the plates 120 and to provide a guideway for a T-shaped staple driver 128. It will be understood by reference to Fig. 9 that the members 116 thus provide ledges in front of the staple driver upon which the legs of the staple are supported at the end of the transferring movement of the staple and in the staple-driving operation. Secured on one of the members 116 by its clamping screw 118 is an auxiliary staple-guiding member 130 which is formed of spring metal and is so shaped as to extend upwardly into the path of the driver 128 and between the legs of the staple at the outlet end of the staple nozzle to assist in guiding the legs, the staple-guiding portion of this member being displaceable downwardly by the driver 128 near the end of its driving movement.

For transferring each staple downwardly from forming position to driving position, there is provided a transferring member 136 which is shaped to embrace the inside former 112, as shown in Fig. 7, and is moved forwardly with the inside former in the staple-forming operation. The transferring member 136 is fastened at its upper end to a slide 138 (Fig. 4) which is vertically movable in a guideway 140 formed in the slide 72. An ear 142 on the slide 138 is connected by a link 144 to one arm of a bell-crank lever 146 (Fig. 2) the other arm of which is provided with a roll 148 engaged by a peripheral cam 150 on the cam wheel 68. A spring 152 acts on the lever 146, when permitted by the cam 150, to impart staple-transferring movement yieldingly to the member 136, and the cam acts to return the member thereafter to its starting position in which its lower end face is above the position in which the staple is formed. For limiting the downward movement of the transferring member there is provided a stop screw 154 threaded in a forward extension of the slide 72, the head of which is engaged by a lug 156 extending downwardly from the ear 142 of the slide 138. It will be understood that in its transferring movement the member 136 is guided between the inside former 112 and the outside former 84. For guiding the staple during its transfer the inside former 112 is extended downwardly as far as the path of the driver 128, and the plates 120 of the staple nozzle are recessed to provide walls in line with the walls of the outside former to co-operate with the downward extension of the inside former in providing a guideway for the staple. It will be evident that when the staple is formed it lies in a plane parallel to the direction of movement of the slide 72 and that when it is driven it lies in a differently inclined plane parallel to the path of movement of the driver 128, and the lower end of the transferring member 136 is so shaped as to tip the staple and position it in proper relation to the path of movement of the driver at the end of the transferring operation. It will be further understood that the lower end of the transferring member co-operates with the ledges formed on the nozzle members 116 to guide the legs of the staple in the driving operation.

The staple driver 128 is secured to a driver slide 158 (Fig. 4) which is movable in a guideway formed in a bracket 160 secured by screws 162 to a forward extension of the slide 72. The driver slide 158 is operated by a lever 164 which is pivoted on a stud 166 on the forward extension of the slide 72 and is provided at its lower end with a block 168 which is swiveled in a recess in the driver slide. The block 168 is adjustable in a guideway formed in the lever 164 to determine the position of the driver at the end of its driving movement, the adjustment being effected by a screw 170 in the lever 164 and the block being held in adjusted position by a screw 172. For imparting operative movement to the lever 164 there is provided a bell-crank lever 174 which is pivotally mounted on a stud 176 on the slide 72 and is operated by a torsion spring 178 (Fig. 1). Means similar to that disclosed in Letters Patent No. 1,796,451, above referred to, is provided for adjusting the tension of the spring 178. A forwardly extending arm of the bell-crank lever 174 carries a roll 180 which lies in a cam slot 182 formed in the lever 164. The cam slot 182 is so formed that staple-driving movement is imparted to the lever 164 by upward movement of the forwardly extending arm of the bell-crank lever 174, and driver-retracting movement is imparted to the lever by downward movement of the arm. The cam slot 182 at its opposite ends is provided with portions which are concentric with the axis of movement of the lever 174 when the roll 180 is positioned in the respective end portions of the slot, so that the position of the driver 128 at the end of its movement in either direction may be accurately determined by the adjustment of the block 168 irrespective of such small variations as there may be in the extent of the movement of the lever 174. The operative movement of the lever 174 under the force of the spring 178 is limited by a fiber disk 184 adjustably secured in a recess in the slide 72 in position to be engaged by a downwardly extending arm of the lever.

For imparting swinging movement to the bell-crank lever 174 against the resistance of its spring 178 to retract the driver 128 preparatory to the staple-driving operation, there is pivoted at 186 (Fig. 4) on the head of the machine a lever 188 on which is pivotally mounted at 190 a latch 192 for engaging the lower end of a plate 194 fast on the downwardly extending arm of the lever 174. A spring 196 connected at one end to the latch 192 and at its other end to a pin 198 on the lever 188 holds the latch in engagement with the plate 194 when the slide 72 and the parts carried thereby are in their initial retracted positions. When the slide 72 is moved forwardly toward the shoe, the latch 192 acts to swing the bell-crank lever 174 against the resistance of its spring in response to such forward movement, thereby retracting the staple driver as the latter is being carried bodily forward with the slide. For operating the latch 192 to release the lever 174 for the staple-driving operation, the slide 72 carries an adjustable screw 200 the head of which is arranged to engage a finger 202 projecting upwardly from the latch and thus to swing the latch downwardly and disengage it from the plate 194. The forward movement of the slide 72, however, does not carry the screw 200 far enough to act on the finger 202, since it is necessary to allow time for the transfer of the staple after the slide has arrived at the end of its forward movement. Release of the lever 174 is accordingly effected in response to a movement of the latch-carrying lever 188 such as to cause the screw 200 to act on the finger 202 to disconnect the latch from the plate 194, this movement of the lever 188 being effected by a path cam 204 (Fig. 3) formed in one side of the cam wheel 68 and engaging a roll 206 (Fig. 2) on the lever 188. In the return of the parts to starting positions the latch 192 is engaged by a stop shoulder 208 on the lever 188 to hold it in position to connect again with the plate 194 when the slide 72 arrives at the end of its retractive movement.

For curving the legs of the staple to anchor them in the shoe there is provided a deflector 210 the lower end of which occupies a position opposite the end of the staple-guiding passage in the nozzle members 116 for engaging the staple legs at the same side of the work from which the staple is driven, i. e., without the presence of any portion of the work between the deflector and the nozzle. The member 210 is provided with grooves 212 (Fig. 6) for guiding the staple legs in the proper paths, and is thus arranged to deflect or curve different portions of the legs successively in the driving operation, before the different respective portions enter the shoe, in directions transverse to the plane of the staple, i. e., the plane including the legs and the cross-bar prior to deflection of the legs. It will be observed that in the construction shown the staple is driven by force applied in a direction inclined outwardly toward the edge of the insole, or toward that side of the shoe adjacent to which the staple is driven, with the cross-bar of the staple substantially parallel to the edge of the insole, and that the deflector 210 is arranged to cause the staple legs to enter the shoe in directions approximately perpendicular to the bottom face of the insole and then to follow throughout substantially their whole lengths curved paths leading inwardly away from the edge of the insole in directions substantially opposite to that of the drive, the degree of curvature of the legs being preferably such that their ends return toward the outer or bottom face of the insole without penetrating its inner face.

The deflector 210 is supported on a pivot pin 214 mounted in lugs 216 (Fig. 4) extending downwardly from the bracket 94, the pin being held detachably in place by a spring member 218 which lies in a groove formed in the pin. The pin may thus be readily removed to permit replacement of the deflector. The deflector 210 extends downwardly through a guiding slot formed in a plate 220 (Figs. 5 and 6) which is secured on the bracket 94 by one of the screws 96, and it is engaged by an eccentric abutment 222 on a shaft 224 to determine its position with respect to turning movement about the pin 214. The shaft 224 is adjustable to vary the position of the deflector and thus to vary the curvature of the staple legs, by means described and claimed in the copending application of which this application is a division.

It will be understood that the movement of the overlaying and fastening means in a path inclined forwardly and downwardly toward the bottom of the shoe, whereby the margin of the upper is engaged and laid over the bottom face of the insole to receive the staple, is a movement of fixed extent, and that the position of the staple nozzle and the deflector 210 relatively to the bottom face of the insole at the end of this movement will depend upon how the operator holds the shoe in engagement with the edge gage 20 and the sole rest 22 for each lasting operation. In order to relieve the operator of the necessity of exercising special care in presenting the shoe, and to insure that, notwithstanding such variations in the lateral inclination of the shoe as are practically inevitable in presenting it successively to the lasting instrumentalities, the overlaying and fastening means will be moved into sufficiently close relation to the bottom face of the insole for the best results, the machine is provided with means for imparting to the overlaying and fastening mechanism, after it has been moved inwardly over the bottom of the shoe, a movement in a different direction toward the bottom face of the insole immediately before the staple is driven. For this purpose the member 70, which provides a guideway for the slide 72, is secured by screws 240 (Fig. 4) to a holder 242 which has a downwardly extending portion fast on a rock shaft 244 mounted in the head of the machine. Secured also on this rock shaft is a lever 246 (Figs. 1 and 2) provided with a roll 248 engaged by a path cam 250 formed in one side of a cam wheel 252 (Fig. 3) on the cam shaft 54. It will thus be seen that by the action of the cam 250 on the lever 246 the slide 72 and the mechanism carried thereby are swung downwardly toward the bottom of the shoe in a direction substantially at right angles to the direction of their movement inwardly over the shoe. Regardless, therefore, of such small variations in the lateral inclination of the shoe as may occur in presenting the shoe in different positions, the staple nozzle and the deflector 210 are moved downwardly far enough to insure that the deflector will be pressed firmly against the upper materials so as to hold them securely against the insole until the staple is driven and to insure that the staple will be fully driven and securely anchored in the insole. It will be understood that after driving the staple the staple driver 128 remains at the end of its driving movement until a predetermined time in the operation of the machine upon the next shoe, and in order to prevent any possibility of loosening the staple by the engagement of the driver therewith in the retracting movement of the stapling mechanism, the cam 250 is so shaped, as illustrated in Fig. 2, as to impart to the slide 72, immediately after the staple-driving operation and prior to the retracting movement of the slide along its inclined guideway, a reverse upward swinging movement which is of somewhat greater extent than the extent of its downward swinging movement prior to the driving of the staple. Thereafter, in time relation to the retractive movement of the slide 72 effected by the cam 74, the cam 250 swings the slide back to a normal position preparatory to operations on the next shoe.

In the operation of the machine, briefly summarized, the operator presents the shoe in engagement with the edge gage 20 and with the sole rest 22 in position for the gripper jaws 42 to engage that portion of the upper upon which a lasting operation is to be performed, and then starts the machine by depressing the starting treadle. The gripper then grips the upper and pulls it heightwise of the last and inwardly over the insole in the manner more fully described in said Letters Patent No. 1,796,451. In pulling the upper inwardly over the insole the gripper is positioned substantially as indicated by dotted lines in Fig. 10. While the gripper is thus holding the upper and overlaying and fastening mechanism is moved forwardly or inwardly over the bottom of the shoe in a path inclined toward the bottom face of the insole by the action of the cam 74 on the slide 72, as illustrated by Figs. 10 and 11. In this movement the overlaying and fastening mechanism, including the staple nozzle and the deflector 210, engages the margin of the upper at a substantial distance above the bottom face of the insole, as shown in Fig. 10, and lays the margin of the upper upon said face, as indicated in Fig. 11. In this operation the nozzle and deflector engage the upper in a location somewhat displaced lengthwise of the edge of the shoe bottom from the gripper jaws 42. By the forward movement of the slide 72 a section of staple wire is severed by the action of the cutter 88 in co-operation with the nozzle 90, and the section of wire is forced by the inside former 112 into the outside former 84 to form a staple. By the same movement of the slide 72 also the staple driver 128 is retracted against the resistance of the spring 178 through the action of the latch 192 upon the bell-crank lever 174.

After the slide 72 has completed its forward movement, the staple-transferring member 136 is operated by the cam 150 to force the formed staple downwardly into the path of movement of the driver. At substantially the same time also the slide 72 is swung about the axis of the rock shaft 244 by the action of the cam 250 on the lever 246 to force the deflector 210 and the staple nozzle downwardly against the upper with increased pressure. In predetermined time relation to these operations, and preferably at or near the time when the fastening mechanism arrives in the position indicated by Fig. 11, the gripper releases its hold on the upper, and the downward movement of the nozzle and deflector insures that the upper will be firmly pressed against the insole and held against loss of tension until the staple is driven. After the deflector 210 has been pressed hard against the work by the swinging of the slide 72, the driver lever 174 is released by the latch 192 to the action of the spring 178 in response to movement of the lever 188, and the driver 128 is thereby rendered operative to drive the staple, as illustrated in Fig. 12.

It will be evident that the operative movement of the driver is in a direction inclined outwardly toward the edge of the insole, or toward the rearwardly facing side of the shoe, and generally opposite to the direction of the overdrawing pull of the gripper on the upper, and that by the action of the deflector 210 the legs of the staple are so deflected as to follow curved paths leading inwardly away from the edge of the insole, the degree of curvature preferably being such that the ends of the legs return toward the outer face of the insole. The ends of the legs thus curved may or may not penetrate the outer face of the insole, since in either event there is no danger that they will work up into the interior of the shoe in the wear of the shoe. After the staple has thus been driven and anchored, the slide 72 is swung upwardly to insure that the end of the driver 128 will not catch on the head of the staple, and the slide is then retracted to its starting position along with other operating parts of the machine, the plate 194 on the driver-operating lever 174 being carried by this movement into position for the latch 192 to re-engage it.

After the shoe has thus been operated upon in one location, the operator moves it along to present a different portion of the upper to the action of the upper-pulling and fastening mechanisms. It will be evident that when the staples are driven and anchored in the manner described, the pull or strain of the lasted upper thereon, which is principally in a direction outwardly toward the edge of the insole, tends to turn each staple about the axis of curvature of its legs in the same direction in which the legs were deflected or curved in the driving operation, so that the staples maintain a firm hold on the upper by the security of their anchorage in the insole.

Fig. 15 shows a portion of a shoe of the through-and-through sewed type, illustrating the relation of the staples *s* driven and anchored as hereinbefore described to the seam *t* whereby the outsole is secured to the upper and insole. It will be evident that when the staples are driven and anchored in the manner illustrated, they may be so applied as to penetrate the upper in locations nearer the edge of the insole, without danger that their legs will interfere with the outsole stitches, than if the legs were deflected outwardly toward the edge of the insole to anchor them.

While the invention is illustrated and described with particular reference to the manufacture of shoes having an outsole and an insole in the relation disclosed, the invention in various aspects, as hereinbefore stated, is not limited in utility to the manufacture of that particular type of shoe, and the term "sole" is accordingly used in many of the claims in a comprehensive sense to include both the insole of some types of shoes and also that part which in shoes of other types may be the outsole or the only sole with which the shoe is provided. It is to be further understood that in the claims the expression "edge of the sole" is used for convenience to designate that portion of the edge which is nearest to the location where the fastening is inserted, and that the expression "bottom face of the sole" is used with reference to that portion of the sole which is outermost at the time of the lasting of the shoe, regardless of its position in the completed shoe.

The method of lasting herein disclosed is claimed in another divisional application, Serial No. 422,454 filed on Jan. 21, 1930; and the method of upper-fastening per se and the product of the method are claimed in still another divisional application, Serial No. 422,452 filed on Jan. 21, 1930.

Having described the invention, what I claim as new and desire to secure by Letters Patent of the United States is:—

1. A machine of the class described having, in combination, means for subjecting an unlasted portion of an upper to lasting strain to shape it over a last and for positioning it in lasted relation to a sole on the last, and means for fastening the upper in lasted position comprising mechanism for driving a fastening through the upper and into the sole and for directing the fastening substantially throughout its length in a curved path leading inwardly away from the edge of the sole to anchor it in the sole.

2. A machine of the class described having, in combination, means for subjecting an unlasted portion of an upper to lasting strain to shape it over a last and for positioning it in lasted relation to a sole on the last, means for driving a fastening through the upper and into the sole to hold the upper in lasted position, and means arranged to engage the fastening before it enters the sole and during the drive to deflect it in a curved path leading inwardly away from the edge of the sole for anchoring it in the sole.

3. A machine of the class described having, in combination, means for subjecting an upper to lasting strain to shape it over a last and for positioning it in lasted relation to a sole on the last, and means for fastening the upper in lasted position comprising mechanism for driving a staple through the upper and into the sole with its cross-bar extending lengthwise of the edge of the sole and for directing the legs of the staple from the points where they enter the sole in curved paths leading inwardly away from the edge of the sole to anchor them.

4. A machine of the class described having, in combination, means for subjecting an upper to lasting strain to shape it over a last and for positioning it in lasted relation to a sole on the last, means for driving a staple through the upper and into the sole with its cross-bar extending lengthwise of the edge of the sole to fasten the upper in lasted position, and means arranged to engage different portions of the legs of the staple successively in the driving operation, before the different respective portions enter the sole, to deflect them in curved paths leading inwardly away from the edge of the sole for anchoring them therein.

5. A machine of the class described having, in combination, means for subjecting an upper to lasting strain to shape it over a last and for positioning it in lasted relation to a sole on the last, and means for fastening the upper comprising a driver movable in a direction inclined outwardly toward the edge of the shoe bottom to drive a fastening through the upper and into the sole.

6. A machine of the class described having, in combination, means for subjecting an upper to lasting strain to shape it over a last and for positioning it in lasted relation to a sole on the last, and means for fastening the upper to hold it against outward strain toward the edge of the sole, said fastening means comprising a driver movable in a direction inclined outwardly toward the edge of the sole to drive a fastening through the upper and into the sole and also means for engaging the fastening before it enters the shoe and during the drive and deflecting it progressively out of the line of drive to anchor it.

7. A machine of the class described having, in combination, means for subjecting an upper to lasting strain to shape it over a last and for positioning it in lasted relation to a sole on the last, a driver movable in a direction inclined outwardly toward the edge of the sole to drive a fastening through the upper and into the sole, and means arranged to engage the fastening in the driving operation at the same side of the work from which it is driven to deflect it substantially throughout its length in a curved path leading inwardly away from the edge of the sole for anchoring it in the sole.

8. A machine of the class described having, in combination, means for subjecting an upper to lasting strain to shape it over a last and for positioning it in lasted relation to a sole on the last, a driver movable in a direction inclined outwardly toward the edge of the sole to drive a staple through the upper and into the sole with its cross-bar extending lengthwise of the edge of the sole, and means arranged to engage different portions of the legs of the staple successively in the driving operation, before the different respective portions enter the sole, to deflect them in curved paths leading inwardly away from the edge of the sole for anchoring them therein.

9. A machine of the class described having, in combination, a gripper and means for operating it to pull an upper over a last, means for driving a fastening through the upper and the bottom face of a sole on the last to fasten the upper, and means arranged to engage different portions of the fastening successively in the driving operation, before the different respective portions enter the shoe, to deflect the fastening in a curved path leading inwardly away from the edge of the sole for anchoring it in the sole.

10. A machine of the class described having, in combination, a gripper and means for operating it to pull an upper over a last, means for driving a staple through the upper and the bottom face of a sole on the last with the cross-bar of the staple extending lengthwise of the edge of the sole to fasten the upper, and means arranged to engage the legs of the staple in the driving operation at the same side of the work from which the staple is driven to deflect them in curved paths leading inwardly away from the edge of the sole for anchoring them in the sole.

11. A machine of the class described having, in combination, means for pulling an upper over a last and inwardly over a sole on the last, means for driving a fastening through the upper and into the sole by force applied in a direction inclined outwardly toward the edge of the sole, and deflecting means arranged to engage the fastening in the driving operation at the same side of the work from which it is driven to deflect it in a curved path leading inwardly away from the edge of the sole to anchor it.

12. A machine of the class described having, in combination, means for pulling an upper over a last and inwardly over a sole on the last, a driver movable in a direction inclined outwardly toward the edge of the sole to drive a staple through the upper and into the bottom face of the sole with its cross-bar extending lengthwise of the edge of the sole to fasten the upper, and deflecting means arranged to engage different portions of the legs of the staple successively in the driving operation, before the different respective portions enter the sole, to deflect them in curved paths leading inwardly away from the edge of the sole and reversely toward its bottom face.

13. A machine of the class described having, in combination, means for pulling an upper over a last having a sole thereon, and upper-fastening mechanism movable inwardly over the bottom of the shoe to lay the margin of the upper upon the sole, said upper-fastening mechanism comprising means for driving a fastening through the upper and into the sole and means for engaging the fastening at the same side of the work as the driving means to deflect it in a curved path leading inwardly away from the edge of the sole to anchor it.

14. A machine of the class described having, in combination, means for pulling an upper over a last having a sole thereon, and upper-fastening mechanism movable inwardly over the bottom of the shoe to lay the margin of the upper upon the sole, said upper-fastening mechanism comprising a driver movable in a direction inclined outwardly toward the edge of the sole to drive a fastening through the upper and into the sole and a deflector for engaging the fastening in the driving operation at the same side of the work as the driver to deflect it in a curved path leading inwardly away from the edge of the sole to anchor it.

15. A machine of the class described having, in combination, means for pulling an upper over a last having a sole thereon, and upper-fastening mechanism comprising a driver and a deflector movable together inwardly over the bottom of the shoe to lay the margin of the upper upon the sole, the driver being movable thereafter in a direction inclined outwardly toward the edge of the sole to drive a staple through the upper and into the sole with its cross-bar extending lengthwise of the edge of the sole, and the deflector being arranged to engage the legs of the staple in the driving operation at the same side of the work as the driver to deflect them in curved paths leading inwardly away from the edge of the sole to anchor them.

16. A machine of the class described having, in combination, means for pulling an upper over a last and inwardly over a sole on the last, and upper-fastening mechanism movable inwardly over the bottom of the shoe in a direction inclined toward the bottom face of the sole to lay the margin of the upper upon said face, said upper-fastening mechanism comprising a driver movable in a direction inclined outwardly toward the edge of the sole to drive a fastening through the upper and into the sole and also means for engaging different portions of the fastening successively in the driving operation, before the different respective portions enter the sole, to curve them inwardly away from the edge of the sole.

17. A machine for lasting successively different portions of a shoe presented manually in different lasting positions having, in combination, a rest for engaging a side of the shoe, a gripper for pulling the upper at that side of the shoe in each lasting position of the shoe, and means for fastening the upper in each lasting position, said upper-fastening means comprising a driver movable over the bottom of the shoe in a direction inclined outwardly toward that side of the shoe engaged by said rest to drive a fastening and a deflector arranged to engage the fastening before it enters the shoe and during the drive to curve it inwardly away from the above-mentioned side of the shoe to anchor it.

18. A machine for lasting successively different portions of a shoe presented manually in different lasting positions having, in combination, a rest for engaging a side of the shoe, a gripper for pulling the upper at that side of the shoe over the last and inwardly over a sole on the last in each lasting position of the shoe, and upper-fastening mechanism movable inwardly over the bottom of the shoe in a direction inclined toward the bottom face of the sole to lay the upper upon said face in each lasting position, said upper-fastening mechanism comprising a driver movable over the bottom of the shoe in a direction inclined outwardly toward that side of the shoe engaged by said rest to drive a fastening through the upper and into the sole and a deflector arranged to engage the fastening before it enters the sole and during the drive to deflect it inwardly away from the above-mentioned side of the shoe to anchor it.

19. A machine of the class described having, in combination, means for pulling an upper over a last, and means for laying the margin of the tensioned upper over a sole on the last, said overlaying means being so controlled as to move inwardly over the sole in a direction inclined toward the outer face of the sole to lay the upper over said face and also to move, independently of any influence of the shoe thereon, in another direction to press the upper more firmly against the sole.

20. A machine of the class described having, in combination, means for pulling an upper over a last, a device for laying the margin of the tensioned upper over a sole on the last, and automatic means for imparting to said overlaying device movement inwardly over the sole in a direction inclined toward the outer face of the sole to lay the upper over said face and additional movement in another direction, independently of any influence of the shoe on said device, to press the upper more firmly against the sole after said inward movement has been substantially completed.

21. A machine of the class described having, in combination, means for pulling an upper over a last, a device for laying the margin of the tensioned upper over a sole on the last, and cams for imparting respectively to said overlaying device rectilinear movement inwardly over the sole in a direction inclined toward the outer face of the sole to lay the upper over said face and swinging movement to press the upper more firmly against the sole.

22. A machine of the class described having, in combination, means for pulling an upper over a last, means mounted for movement inwardly over a sole on the last in a direction inclined toward the outer face of the sole to lay the margin of the tensioned upper over said face, and means for effecting independently of said inward movement a relative movement of said overlaying means and the last in a direction different from that of the inward movement of said overlaying means over the sole to press the upper more firmly against the sole.

23. A machine of the class described having, in combination, a sole rest arranged to engage the bottom of a shoe on a last supported by an operator, means for pulling the shoe upper over the last, and means movable inwardly over the bottom of the shoe in a direction inclined toward the outer face of a sole on the last to lay the margin of the tensioned upper over the sole, said overlaying means and the sole rest being relatively movable, at an automatically determined time in the operation of the machine, in a direction different from that of the inward movement of said means over the shoe and independently of said inward movement to cause said means to press the upper more firmly against the sole.

24. A machine of the class described having, in combination, a sole rest arranged to engage the bottom of a shoe on a last supported by an operator, means for pulling the shoe upper over the last, means movable inwardly over the bottom of the shoe in a direction inclined toward the outer face of a sole on the last to lay the margin of the tensioned upper over the sole, and automatic means for effecting, independently of the inward movement of the overlaying means over the shoe, a relative movement of said overlaying means and the sole rest in a direction different from that of said inward movement after said movement has been substantially completed to cause the overlaying means to press the upper more firmly against the sole.

25. In a machine for lasting successively different portions of a shoe presented manually in different lasting positions, the combination with a sole rest arranged to engage the sole of the shoe and relatively to which the shoe may be tipped by the operator at different inclinations, of a gripper for pulling the shoe upper over the last in each lasting location, a member movable inwardly over the shoe in a direction inclined toward the outer face of the sole to engage the margin of the upper after it has been pulled by the gripper and to lay it inwardly over said face in position to be fastened to the sole, and means for imparting to said member, independently of any influence of the shoe thereon, a movement toward the sole in a direction different from that of its inward movement over the shoe after its inward movement has been substantially completed to insure that the upper will be firmly pressed against the sole prior to the fastening operation.

26. In a machine for lasting successively different portions of a shoe presented manually in different lasting positions, the combination with a sole rest arranged to engage the sole of the shoe and relatively to which the shoe may be tipped by the operator at different inclinations, of a gripper for pulling the shoe upper over the last in each lasting location, a member movable in a direction inclined toward the outer face of the sole to engage the margin of the upper at a substantial distance from said face after it has been pulled by the gripper and to lay it over said face, means for imparting the overlaying movement to said member, and additional means automatically operative substantially at the end of said overlaying movement to swing said member toward the outer face of the sole for increasing its presure on the upper.

27. A machine of the class described having, in combination, means for pulling an upper over a last, and means for laying the margin of the tensioned upper over a sole on the last and for driving a fastening to fasten the upper to the sole, said overlaying and fastening means being movable inwardly over the outer face of the sole to lay the upper over said face and then movable in a direction different from that of its inward movement over the sole to position it in closer relation to the sole prior to the fastening operation.

28. A machine of the class described having, in combination, means for pulling an upper over a last, overlaying and fastening mechanism for laying the margin of the tensioned upper over a sole on the last and for driving a fastening to fasten the upper to the sole, and automatic means for imparting to said overlaying and fastening mechanism movement inwardly over the outer face of the sole to lay the upper over said face and also movement in a direction different from that of its inward movement over the sole to position it in closer relation to the sole prior to the driving of the fastening.

29. A machine of the class described having, in combination, means for pulling an upper over a last, overlaying and fastening mechanism for laying the margin of the tensioned upper over a sole on the last and for fastening the upper to the sole, said overlying and fastening mechanism including means for driving a fastening and means for deflecting different portions of the fastening successively out of the line of drive before they enter the shoe to anchor the fastening in the shoe, and means for imparting to said overlaying and fastening mechanism movement inwardly over the outer face of the sole to lay the upper over said face and also movement in a direction different from that of its inward movement over the sole to position it in closer relation to the sole.

30. A machine of the class described having, in combination, means for pulling an upper over a last, overlaying and fastening mechanism for laying the margin of the tensioned upper over a sole on the last and for fastening the upper to the sole, said overlaying and fastening mechanism including means for driving a fastening and means for deflecting different portions of the fastening successively out of the line of drive before they enter the shoe to anchor the fastening in the shoe, and automatic means for imparting to said overlaying and fastening mechanism movement inwardly over the sole in a direction inclined toward the outer face of the sole to lay the upper over said face and also movement in a direction different from that of its inward movement over the sole after said inward movement has been substantially completed to position it in closer relation to the sole.

31. A machine of the class described having, in combination, means for pulling an upper over a last, and means for laying the margin of the tensioned upper over a sole on the last and for fastening the upper to the sole, said overlaying and fastening means being so controlled as to move inwardly over the sole in a direction inclined toward the outer face of the sole to lay the upper over said face and then to move, independently of any influence of the shoe thereon, in another direction to position it in closer relation to the sole.

32. A machine of the class described having, in combination, a sole rest arranged to engage the bottom of a shoe on a last supported by an operator, means for pulling the shoe upper over the last, and overlaying and fastening mechanism movable inwardly over the bottom of the shoe to lay the margin of the tensioned upper over a sole on the last into position to be fastened to the sole, said overlaying and fastening mechanism and the sole rest being relatively movable in a direction different from that of the inward movement of said mechanism over the shoe to position said mechanism in closer relation to the sole prior to the fastening operation.

33. A machine of the class described having, in combination, a sole rest arranged to engage the bottom of a shoe on a last supported by an operator, means for pulling the shoe upper over the last, overlaying and fastening mechanism for laying the margin of the tensioned upper over the outer face of a sole on the last and for driving and anchoring a fastening to fasten the upper to the sole, and automatic means for imparting to said over-laying and fastening mechanism movement inwardly over the sole in a direction inclined toward the outer face of the sole to lay the upper over said face and then movement in a direction different from that of its inward movement over the sole to position it in closer relation to the sole.

34. A machine of the class described having, in combination, a sole rest arranged to engage the bottom of a shoe on a last supported by an operator, means for pulling the shoe upper over the last, overlaying and fastening mechanism for laying the margin of the tensioned upper over the outer face of a sole on the last and for fastening the upper to the sole, said mechanism including means for driving a staple and means for curving different portions of the legs of the staple successively before the different respective portions enter the shoe to anchor the staple in the sole, and automatic means for imparting to said overlaying and fastening mechanism movement inwardly over the sole in a direction inclined toward the outer face of the sole to lay the upper over said face and then movement in a direction different from that of its inward movement over the sole to position it in closer relation to the sole prior to the driving of the staple.

In testimony whereof I have signed my name to this specification.

GEORGE GODDU.